(12) United States Patent
Huegerich et al.

(10) Patent No.: US 8,075,282 B2
(45) Date of Patent: Dec. 13, 2011

(54) SPRAYER PUMP PRIMED BY USING VENTURI

(75) Inventors: Daniel Joseph Huegerich, Ankeny, IA (US); Travis Gene Funseth, Ankeny, IA (US); Tonya Marie O'neal, Ankeny, IA (US); Richard Allen Humpal, Ankeny, IA (US)

(73) Assignee: Deere & Company, Moline, IL (US)

( * ) Notice: Subject to any disclaimer, the term of this patent is extended or adjusted under 35 U.S.C. 154(b) by 316 days.

(21) Appl. No.: 12/394,614

(22) Filed: Feb. 27, 2009

(65) Prior Publication Data
US 2010/0218835 A1 Sep. 2, 2010

(51) Int. Cl.
*F04B 23/08* (2006.01)

(52) U.S. Cl. ............... 417/199.2; 239/146; 239/172; 137/202; 137/206

(58) Field of Classification Search ........... 137/493.9, 137/15, 202, 206, 240; 417/199.2, 200; 210/748; 239/127, 146
See application file for complete search history.

(56) References Cited

U.S. PATENT DOCUMENTS

| | | | | |
|---|---|---|---|---|
| 5,878,767 A * | 3/1999 | Etling et al. | ............... | 137/15.01 |
| 6,682,313 B1 * | 1/2004 | Sulmone | ............... | 417/199.2 |
| 6,814,877 B2 * | 11/2004 | Gargas | ............... | 210/748.2 |
| 7,334,600 B2 * | 2/2008 | Scott | ............... | 137/202 |
| 7,360,556 B2 * | 4/2008 | Mijers | ............... | 137/493.9 |
| 7,757,634 B2 * | 7/2010 | Croft | ............... | 119/14.01 |

FOREIGN PATENT DOCUMENTS

| | | |
|---|---|---|
| EP | 2148119 | 1/2010 |
| FR | 2914916 | 10/2008 |
| FR | 2914916 A1 * | 10/2008 |
| NL | 1005112 | 7/1998 |
| NL | 1005112 C2 * | 7/1998 |
| RU | 2015669 | 7/1994 |
| RU | 2015669 C1 * | 7/1994 |

OTHER PUBLICATIONS

Primax Pumps USA, CP100i Auto-Prime Pump, www.primaxpumps.com, Bakersfield CA.
European Search Report received Aug. 30, 2010 (6 pages).

* cited by examiner

*Primary Examiner* — Dinh Nguyen
*Assistant Examiner* — Viet Le

(57) ABSTRACT

An agricultural sprayer includes a centrifugal pump used for transferring fluid from a nurse tank to fill the sprayer tank. It is sometimes required that the centrifugal pump be primed in order to perform the transfer of fluid and this priming is done by creating a vacuum in a priming line that is connected to a suction line extending between an inlet of the pump and to a discharge line of the nurse tank, with the vacuum being caused by routing a flow of compressed air through a venturi having its throat coupled to the priming line.

4 Claims, 1 Drawing Sheet

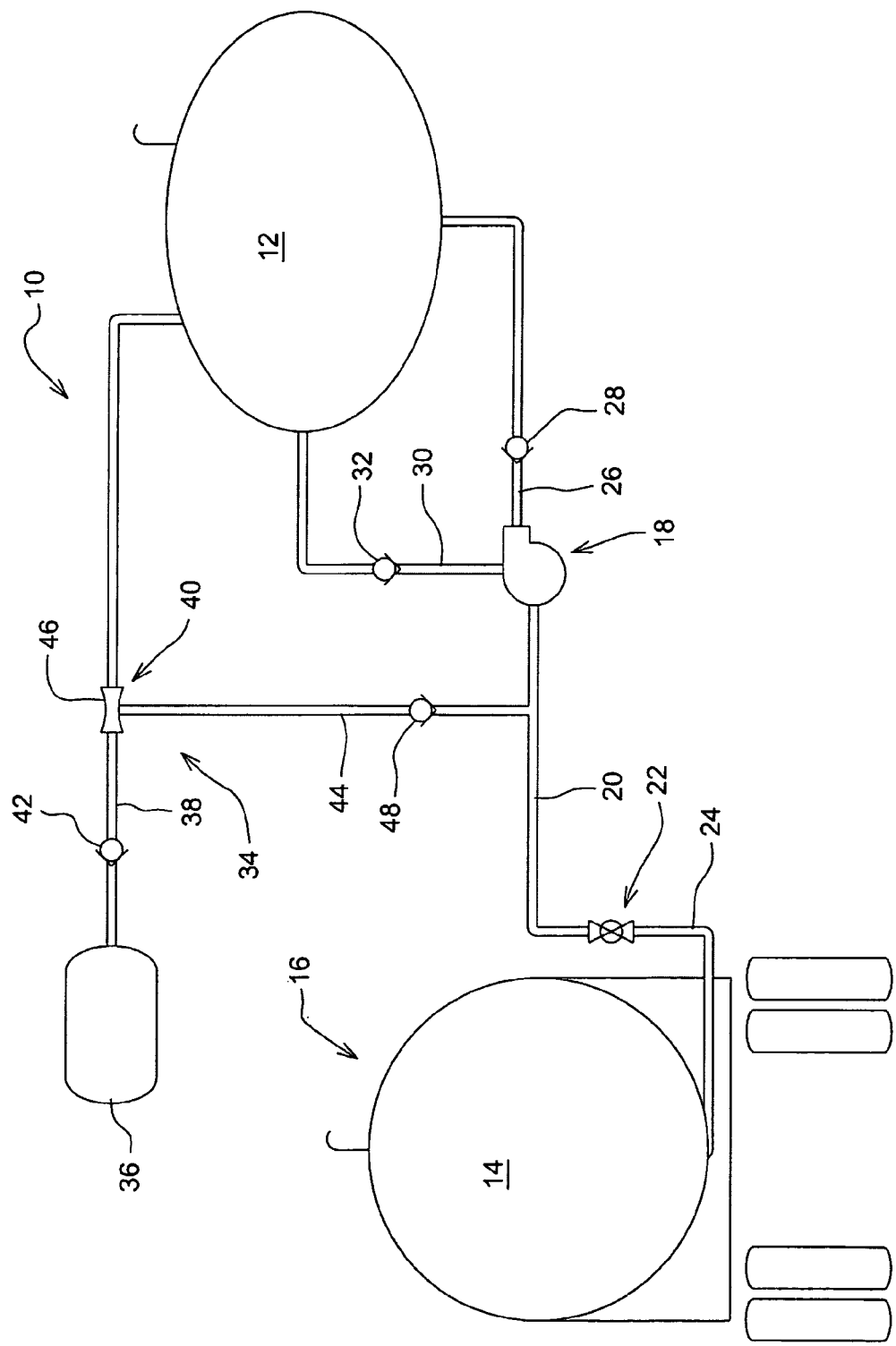

SPRAYER PUMP PRIMED BY USING VENTURI

FIELD OF THE INVENTION

The present invention relates to agricultural sprayers, and more particularly relates to fluid transfer systems used for transferring fluid to the sprayer tank from another tank or source.

BACKGROUND OF THE INVENTION

It is a common practice during agricultural spraying operations to reload the sprayer tank from a tank carried by a nurse vehicle. Oftentimes the nurse tank liquid level is lower that the sprayer pump inlet, especially when the sprayer pump is used with a high clearance sprayer vehicle where the pump is mounted high on the vehicle chassis. A centrifugal pump is a cost effective method of transferring fluid quickly, but such pumps are not able to prime themselves when the liquid source is lower than the pump inlet. Therefore, it is common in the industry to mount centrifugal transfer pumps on the nurse vehicle in a location lower than the liquid level of the nurse vehicle tank.

However, locating a centrifugal transfer pump on the nurse vehicle has some disadvantages in cost, automation and versatility. Specifically, more than one nurse vehicle is often required to service one sprayer. This requires having a transfer pump on each of several nurse vehicles.

While many sprayer manufacturers use centrifugal pumps because they are cost effective and easy to service, and have in the past provided systems which permitted these pumps to serve also as transfer pumps, the aforementioned problem requiring the pumps to be primed when used as transfer pumps has not been adequately resolved, with the result that unprimed pumps may be run dry for a period of time that causes pump failure. Although positive displacement pumps can be used instead of centrifugal pumps since they can be primed from a liquid level lower than the pump inlet, these pumps have the drawbacks of being high in cost and of requiring more time to transfer the fluid.

The problem to be solved then is that of providing a sprayer vehicle with a centrifugal spray pump that can also be used as a transfer pump but which can be easily and reliably primed in the event that the nurse tank fluid level is below the inlet of the pump.

SUMMARY OF THE INVENTION

According to the present invention, there is provided a fluid control system for use with a sprayer vehicle, the system including a way of priming a centrifugal sprayer pump when the latter is being used as a transfer pump for loading the sprayer tank from a nurse tank.

An object of the invention is to provide a fluid control system embodying a venturi through which compressed air may be routed to create a vacuum which evacuates air from the suction line coupling the sprayer centrifugal pump to the nurse tank while drawing liquid into the suction line from the nurse tank, thereby priming the centrifugal pump.

This and other objects will become apparent from reading the ensuing description together with the appended drawings.

BRIEF DESCRIPTION OF THE DRAWINGS

The sole FIGURE is a schematic representation of a fluid control system for use in transferring fluid from a nurse tank to a sprayer tank and embodying a centrifugal pump priming arrangement constructed in accordance with the principles of the present invention.

DESCRIPTION OF THE PREFERRED EMBODIMENT

Referring now to the drawing, there is shown a portion of a self-propelled agricultural sprayer vehicle, including a fluid control system 10 coupled between a sprayer tank 12 and a nurse tank 14 of a wheel-supported nurse vehicle 16. Specifically, there is shown a fluid transfer pump configured as a centrifugal pump 18, which is normally used during spraying operation for drawing fluid from the sprayer tank 12, but is here shown plumbed for being used as a transfer pump with its inlet being coupled to one end of a suction line 20 having another end connected, as by a quick-coupler 22, to an end of a discharge line 24 extending from the nurse tank 14. The centrifugal pump 18 has an outlet coupled to one end of a fluid delivery line 26 having another end coupled to the sprayer tank 12. A check valve 28 is provided in delivery line 26 for preventing fluid from flowing back to the pump 18 in the absence of pressurized fluid being delivered by the pump. A pump bleed line 30 is coupled between the centrifugal pump 18 and the sprayer tank 12, and a check valve 32 is located in the bleed line for preventing flow in the direction of the pump in the absence of pressurized fluid flowing from the pump to the sprayer tank by way of the bleed line 30.

The fluid control system 10 includes a pump priming arrangement 34 comprising a source of compressed air 36, which would be provided on board the sprayer vehicle and includes an air delivery line 38 coupled to an inlet of a venturi 40 having an outlet coupled to an upper location of the sprayer tank 12. An air check valve 42 is provided in the line 38 and permits air to flow only toward the venturi 40. A priming line 44 is coupled between a throat 46 of the venturi and the fluid suction line 20 at a location just upstream of the centrifugal pump 18. A check valve 48 is located in the priming line 44 and prevents flow in the direction of the suction line 20.

In operation, assuming that the centrifugal pump 18 has its inlet above the level of the liquid contained in the nurse tank 14 and, thus, requires priming, the source of compressed air 36 would be actuated to deliver air to the line 38, causing the check valve 42 to open. The, air will then flow through the venturi 40 causing a vacuum to be applied to the priming line 44. This suction causes the check valve 48 to open and air in the suction line 20 will be evacuated while fluid from the nurse tank 14 will be pulled into the suction line 20.

At some point, either before, together with, or after, the actuation of the source of compressed air 36, the drive to the pump 18 is effected with the result being that when fluid enters the pump inlet it will become primed and begin pumping fluid into the sprayer tank 12 by way of the delivery line 26, noting that the pressure of the fluid delivered by the pump will open the check valve 28 in the delivery line and will also open the check valve 32 in the bleed line 30. so that air entrained in the fluid will be bled off to the tank 12 so as to not interfere with the priming action. Once the level of vacuum or suction of the pump exceeds the vacuum caused by the venturi 40, the check , valve 48 located in the priming line 44 will close so as to prevent loss of prime and prevent pump performance degradation. The venturi suction and pump suction levels are balanced in such a way as to accomplish this result without operator intervention and without timed hand-offs.

Once the sprayer tank 12 is filled, the drive to the centrifugal pump 18 is discontinued, with the quick-coupler 22 being disconnected so as to disconnect the discharge line 24 from the suction line 20. Appropriate valve connections (not shown) are then made to connect the inlet side of the pump 18 to the sprayer tank and the outlet side to a sprayer boom, not shown, as is known in the art.

Having described the preferred embodiment, it will become apparent that various modifications can be made without departing from the scope of the invention as defined in the accompanying claims.

The invention claimed is:

1. An agricultural sprayer, comprising: a sprayer tank; a centrifugal pump having an inlet and an outlet; a fluid delivery line coupling said outlet to said tank; a suction line being connected to said inlet and adapted for being connected to a nurse tank discharge line; a compressed air supply; a venturi having an inlet, an outlet and a throat, with said inlet being coupled to said compressed air supply and said outlet being coupled to said sprayer tank; a pump priming line coupled directly between said throat and a location of said suction line upstream of said inlet of said centrifugal pump, said priming line contains a priming check valve which opens only toward said throat, whereby, when said suction line is coupled to said nurse tank discharge line and said pump is operated to cause fluid to be conveyed from said nurse tank to said sprayer tank, said pump may be primed by energizing said compressed air supply to cause a vacuum to be created at said throat and air to be evacuated from said suction line and cause fluid to be drawn to said pump inlet so as to prime said pump.

2. The agricultural sprayer; as defined in claim 1, and further including a pump bleed line coupled between said pump and said sprayer tank, whereby air entrained in fluid is bled from the pump during priming operation.

3. The agricultural sprayer, as defined in claim 1, wherein said fluid delivery line contains a delivered fluid check valve which permits flow only toward said sprayer tank from said centrifugal pump.

4. The agricultural sprayer, as defined in claim 1, wherein an air control check valve is located between said source of compressed air and said inlet of said venturi and opens only toward said venturi.

* * * * *